US012784544B2

(12) United States Patent
Nagesh Kalyanpur et al.

(10) Patent No.: US 12,784,544 B2
(45) Date of Patent: Nov. 3, 2026

(54) GAMING MACHINE AND METHOD WITH REPLAY FEATURE

(71) Applicant: LNW Gaming, Inc., Las Vegas, NV (US)

(72) Inventors: Namitha Nagesh Kalyanpur, The Ponds (AU); Joel Jaffe, Glenview, IL (US); Richard Milosevich, Las Vegas, NV (US); Kenneth Shawn Soong, Henderson, NV (US); Michael W. Tucker, Chicago, IL (US)

(73) Assignee: LNW Gaming, Inc., Las Vegas, NV (US)

( * ) Notice: Subject to any disclaimer, the term of this patent is extended or adjusted under 35 U.S.C. 154(b) by 173 days.

(21) Appl. No.: 18/898,861

(22) Filed: Sep. 27, 2024

(65) Prior Publication Data

US 2025/0022343 A1 Jan. 16, 2025

Related U.S. Application Data

(63) Continuation of application No. 17/856,371, filed on Jul. 1, 2022, now abandoned.

(60) Provisional application No. 63/245,543, filed on Sep. 17, 2021.

(51) Int. Cl.
*G07F 17/32* (2006.01)

(52) U.S. Cl.
CPC ...... *G07F 17/3267* (2013.01); *G07F 17/3211* (2013.01); *G07F 17/3251* (2013.01); *G07F 17/3262* (2013.01)

(58) Field of Classification Search
CPC ............ G07F 17/3267; G07F 17/3211; G07F 17/3251; G07F 17/3262
See application file for complete search history.

(56) References Cited

U.S. PATENT DOCUMENTS 5,700,195 A 12/1997 Halic
5,704,835 A 1/1998 Dietz, II
5,923,249 A 7/1999 Muir
5,976,016 A 11/1999 Moody et al.
5,984,782 A 11/1999 Inoue
6,120,378 A 9/2000 Moody et al.
6,203,429 B1 3/2001 Demar et al.
6,641,477 B1 11/2003 Dietz
6,729,961 B1 5/2004 Millerschone
6,731,313 B1 5/2004 Kaminkow
7,090,580 B2 8/2006 Rodgers et al.
7,094,148 B2 8/2006 Baerlocher et al.
(Continued)

OTHER PUBLICATIONS

US 11,011,022 B2, 05/2021, Olive (withdrawn)

*Primary Examiner* — Chase E Leichliter

(57) ABSTRACT

There is provided a gaming system, gaming machine, and method that utilize an electronic display device configured to display a set of symbol-bearing reels. In a reel spin, the set of reels are spun and stopped to randomly place symbols in an array. In response to one or more triggering conditions, game-logic circuitry performs a replay or rewind operation. In one type of replay operation, a subset of the reels are held while the remaining reels are respun to potentially improve the outcome of that spin. In another type of replay operation, the game-logic circuitry conducts a series of initial spins and then conducts an additional spin for each initial spin that yielded a losing outcome.

14 Claims, 7 Drawing Sheets

(56) References Cited

U.S. PATENT DOCUMENTS 7,198,569 B2 4/2007 Wolf et al.
7,300,351 B2 11/2007 Thomas
7,322,887 B2 1/2008 Belger et al.
7,331,862 B2 2/2008 Rodgers et al.
7,331,866 B2 2/2008 Rodgers et al.
7,387,568 B2 6/2008 Millerschone
7,390,258 B2 6/2008 Millerschone
7,393,276 B2 7/2008 Millerschone
7,473,174 B2 1/2009 Cuddy et al.
7,481,708 B2 1/2009 Baerlocher et al.
7,526,736 B2 4/2009 Kaminkow et al.
7,553,231 B2 6/2009 Rodgers et al.
7,666,083 B2 2/2010 Baerlocher et al.
7,682,246 B2 3/2010 Cregan et al.
7,690,987 B2 4/2010 Baerlocher et al.
7,758,410 B2 7/2010 Hughes
7,785,187 B2 8/2010 Millerschone
7,850,521 B2 12/2010 Rodgers et al.
7,857,695 B2 12/2010 Rodgers et al.
7,958,021 B2 6/2011 Schoonmaker et al.
7,993,195 B2 8/2011 Belger et al.
7,997,979 B2 8/2011 Gatto et al.
8,033,904 B2 10/2011 Gatto et al.
8,062,115 B2 11/2011 Thomas et al.
8,137,181 B2 3/2012 Bleich et al.
8,241,107 B2 8/2012 Moroney
8,241,108 B2 8/2012 Belger et al.
8,257,163 B2 9/2012 Belger et al.
8,550,906 B2 10/2013 Suda et al.
8,562,407 B2 10/2013 Baerlocher et al.
8,562,410 B2* 10/2013 Belger ................ G07F 17/3267 463/16
8,651,928 B2 2/2014 Bansemer et al.
8,795,068 B2 8/2014 Belger et al.
9,017,160 B2 4/2015 Moroney
9,177,441 B2 11/2015 Jaffe
9,396,616 B2 7/2016 Baerlocher et al.
9,536,392 B1 1/2017 Luciano, Jr. et al.
9,710,998 B2* 7/2017 Nelson ................ G07F 17/3211
9,881,443 B2 1/2018 Maher et al.
9,928,691 B2 3/2018 Olive
9,940,775 B2 4/2018 Eaton et al.
10,339,761 B2 7/2019 Olive
10,600,286 B2 3/2020 Marks
10,614,666 B2* 4/2020 Eubanks ............. G07F 17/3267
10,629,030 B2 4/2020 Marks et al.
10,657,770 B2 5/2020 Marks
10,733,849 B2* 8/2020 Marsh ..................... G07F 17/34
10,789,812 B2 9/2020 Sanborn et al.
10,803,697 B2 10/2020 Penacho et al.
10,867,479 B2 12/2020 Sevigny et al.
10,872,500 B2* 12/2020 Peterson ............. G07F 17/3213
10,902,702 B1 1/2021 Sanborn et al.
10,909,799 B2 2/2021 Gupta
10,957,155 B2 3/2021 Tam et al.
10,997,823 B2 5/2021 Marks et al.
11,055,965 B2 7/2021 Malik et al.
11,062,564 B2 7/2021 Marks
11,069,199 B2 7/2021 Marks et al.
2001/0009865 A1* 7/2001 Demar .................... G07F 17/32 463/20
2007/0004489 A1 1/2007 Rodgers et al.
2007/0010316 A1* 1/2007 Baerlocher ......... G07F 17/3265 463/20
2007/0021175 A1 1/2007 Rodgers et al.
2007/0021188 A1 1/2007 Rodgers et al.
2008/0039174 A1* 2/2008 Litman ................... G07F 17/32 463/20
2008/0051179 A1* 2/2008 Okada ..................... G07F 17/32 463/20
2008/0051181 A1* 2/2008 Okada ..................... G07F 17/34 463/20
2008/0113761 A1 5/2008 Belger et al.
2008/0139298 A1* 6/2008 Rodgers .................. G07F 17/32 463/20
2008/0200232 A1* 8/2008 Baerlocher ......... G07F 17/3244 463/20
2008/0254847 A1 10/2008 Millerschone
2008/0318660 A1* 12/2008 Nores ..................... G07F 17/32 463/20
2009/0117986 A1 5/2009 Novero et al.
2009/0117987 A1* 5/2009 Novero .................. G07F 17/34 463/20
2009/0124331 A1 5/2009 Delekta
2009/0131147 A1 5/2009 Baerlocher et al.
2009/0191946 A1 7/2009 Thomas et al.
2009/0227356 A1 9/2009 Moroney
2010/0048284 A1 2/2010 Jaffe
2011/0250946 A1 10/2011 Finch
2011/0256920 A1 10/2011 Belger et al.
2011/0263315 A1 10/2011 Belger et al.
2012/0276980 A1 11/2012 Moroney
2013/0040721 A1 2/2013 Belger et al.
2013/0172064 A1 7/2013 Bansemer et al.
2013/0252699 A1 9/2013 Nauman et al.
2013/0337885 A1 12/2013 Suda et al.
2014/0038694 A1* 2/2014 Baerlocher ............. G07F 17/34 463/20
2014/0045575 A1 2/2014 Belger et al.
2015/0302703 A1* 10/2015 Nelson ................ G07F 17/3262 463/20
2016/0042597 A1 2/2016 Olive
2016/0093150 A1* 3/2016 Penacho ............. G07F 17/3213 463/20
2016/0253873 A1 9/2016 Olive
2016/0343204 A1 11/2016 Maher et al.
2016/0358412 A1 12/2016 Eaton et al.
2017/0076555 A1 3/2017 Luciano, Jr. et al.
2017/0148274 A1 5/2017 Olive
2018/0247486 A1* 8/2018 Gupta ................ G07F 17/3262
2018/0268655 A1 9/2018 Olive
2019/0051097 A1 2/2019 Marks et al.
2019/0051108 A1 2/2019 Marks
2019/0051109 A1 2/2019 Marks
2019/0073876 A1 3/2019 Satterlie
2019/0244488 A1* 8/2019 Marsh ..................... G07F 17/34
2019/0318578 A1 10/2019 Olive
2020/0051381 A1 2/2020 Tam et al.
2020/0051391 A1* 2/2020 Sevigny .............. G07F 17/3211
2020/0074814 A1 3/2020 Marks et al.
2020/0090467 A1 3/2020 Marks et al.
2020/0105101 A1 4/2020 Olive
2020/0105102 A1 4/2020 Olive
2020/0219354 A1 7/2020 Marks
2020/0234530 A1 7/2020 Marks et al.
2020/0242879 A1 7/2020 Marks
2020/0258346 A1 8/2020 Marks
2020/0273293 A1 8/2020 Sanborn et al.
2020/0294361 A1* 9/2020 Peterson ............. G07F 17/3265
2020/0312085 A1 10/2020 Rottcher et al.
2020/0342721 A1 10/2020 Marsh et al.
2020/0380827 A1 12/2020 Sanborn et al.
2020/0388112 A1* 12/2020 Allen, II ............. G07F 17/3267
2021/0012610 A1* 1/2021 Penacho ............. G07F 17/3213
2021/0056810 A1 2/2021 La Guardia et al.
2021/0065500 A1 3/2021 Boese
2021/0082251 A1* 3/2021 Sevigny .................. G07F 17/34
2021/0097812 A1 4/2021 Malik et al.
2021/0110636 A1 4/2021 Halvorson et al.
2021/0110641 A1 4/2021 Gupta
2021/0134120 A1 5/2021 Sanborn et al.
2021/0209898 A1 7/2021 Tam et al.
2021/0217276 A1 7/2021 Sidoti et al.
2021/0225128 A1 7/2021 Marks et al.
2021/0241572 A1 8/2021 Marks et al.
2021/0248864 A1 8/2021 Marks et al.
2021/0256815 A1 8/2021 Tran et al.

(56) References Cited

U.S. PATENT DOCUMENTS

2021/0295654 A1* 9/2021 Kiss .................... G07F 17/3213
2023/0085652 A1* 3/2023 Nagesh Kalyanpur ...................... G07F 17/3267 463/20
2025/0022343 A1* 1/2025 Nagesh Kalyanpur ...................... G07F 17/3211

* cited by examiner

GAMING MACHINE AND METHOD WITH REPLAY FEATURE

CROSS-REFERENCE TO RELATED APPLICATIONS

This application claims the benefit of priority to U.S. patent application Ser. No. 17/856,371, filed Jul. 1, 2022, which claims the benefit of U.S. Provisional Patent Application No. 63/245,543, filed Sep. 17, 2021, the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, LNW Gaming, Inc.

FIELD OF THE INVENTION

The present invention relates to a technological improvement to gaming systems, gaming machines, and methods and, more particularly, to new and improved animations in connection with a symbol array replay feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize an electronic display device configured to display a plurality of symbol-bearing reels 1 through N arranged from left to right. Using a random number generator, game-logic circuitry spins and stops the reels to place symbols in an array along a payline. In response to a triggering symbol on reel N, one or more adjacent advantageous symbols along the payline starting from reel 1, and a non-advantageous symbol adjacent to the advantageous symbols along the payline, the game-logic circuitry performs a replay operation. The replay operation includes holding any reels bearing the advantageous symbols, and animating the respinning and stopping of the remaining reels (except reel N if the triggering symbol is, for example, a wild symbol). The game-logic circuitry awards a payout for any winning symbol combinations along the payline.

According to another embodiment of the present invention, there is provided a gaming system, gaming machine, and method that utilize an electronic display device configured to display a plurality of symbol-bearing reels. Using a random number generator, game-logic circuitry conducts a series of initial spins of the reels. Each initial spin comprises animating the spinning and stopping of the reels to place symbols in an array. In response to a triggering event, the game-logic circuitry conducts an additional spin of the reels for each initial spin that yielded a losing outcome. The game-logic circuitry awards a payout for any winning outcomes resulting from the initial and additional spins.

Additional aspects of the invention will be apparent to those of ordinary skill in the art in view of the detailed description of various embodiments, which is made with reference to the drawings, a brief description of which is provided below.

Figure 1:
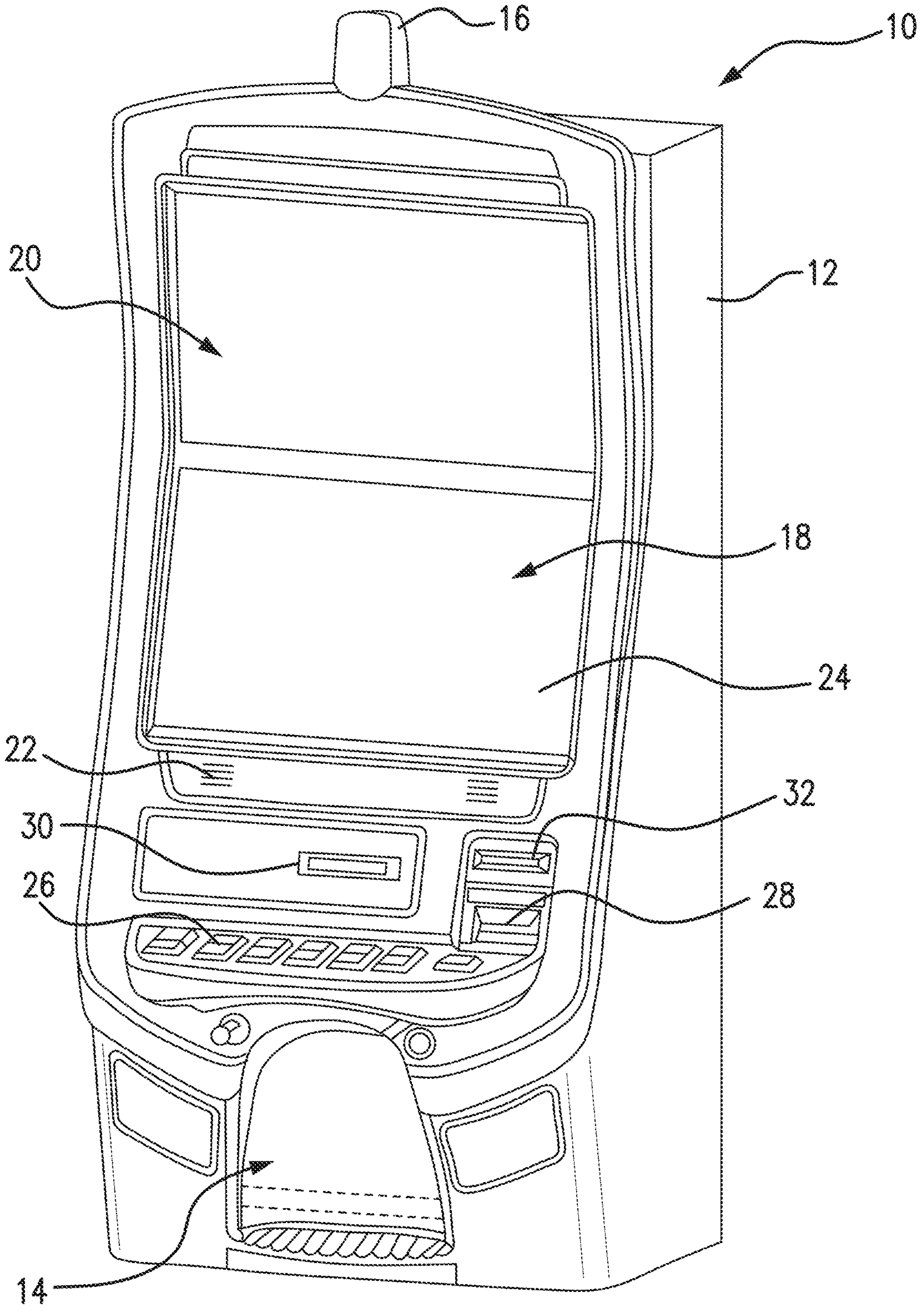
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
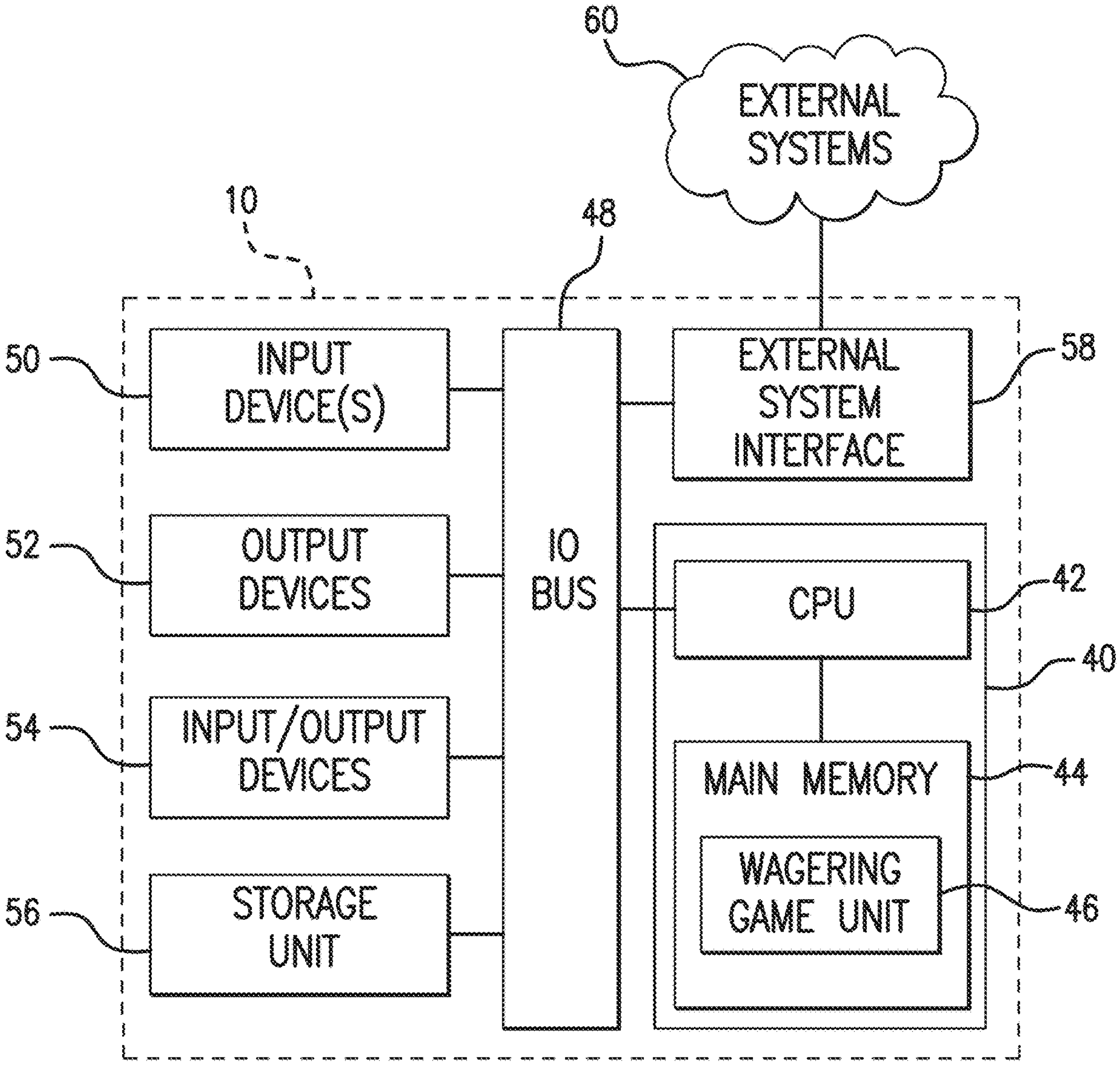
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 3:
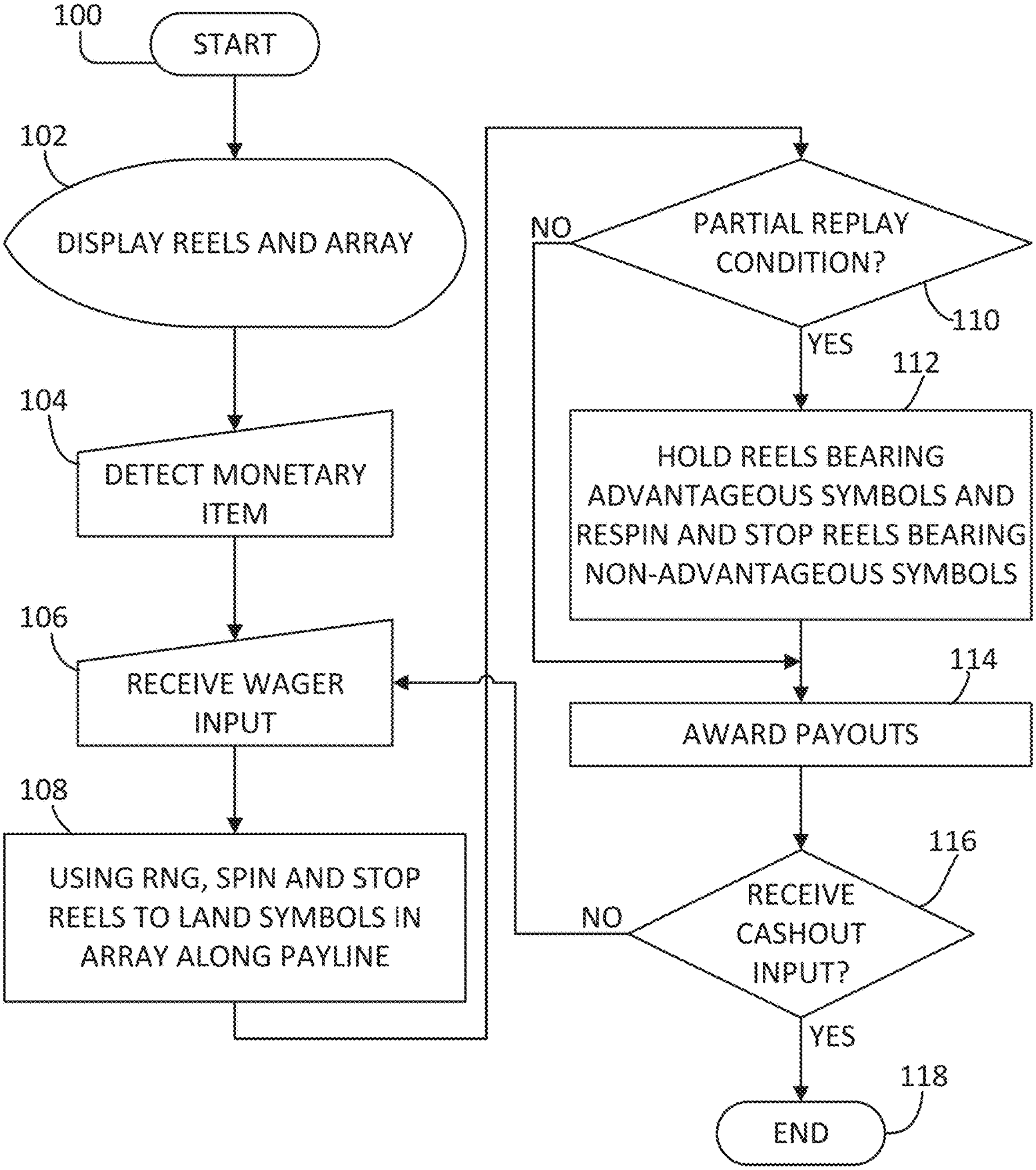
FIG. 3 is a flowchart for an algorithm that corresponds to instructions executed by a controller, according to an embodiment of the present invention.

Referring now to FIG. 3, there is shown a flowchart representing one data processing method corresponding to at least some instructions stored and executed by the game-logic circuitry 40 in FIG. 2 to perform operations according to an embodiment of the present invention. The operations are described below in conjunction with FIGS. 4 and 5, which depict diagrams associated with a game cycle illustrating aspects of this embodiment.

The data processing method commences at step 100. At step 102, the game-logic circuitry directs an electronic display device (e.g., video display) of the gaming machine to display a plurality of symbol-bearing reels and an array of symbol positions. The array of symbol positions comprises a plurality of rows and columns. The rows of the array are oriented in a horizontal direction, and the columns of the array are oriented in a generally vertical direction. Alternatively, the "rows" of the array may be oriented in a vertical direction, and the "columns" of the array may be oriented in a horizontal direction. The symbol positions in each row of the array are horizontally aligned with each other, and the symbol positions in each column of the array are vertically aligned with each other. The reels may be associated with the respective columns of the array such that the reels spin vertically and each reel populates a respective column. The reel spin is animated by depicting symbol-bearing strips moving vertically across the display and synchronously updating the symbols visible on each strip as the strip moves across the display. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position. In the example shown in FIG. 4, the electronic display device displays five symbol-bearing reels 200, 202, 204, 206, 208 arranged from left to right and associated with respective columns of a 3×5 array 210 that includes three rows and five columns.

Figure 4:
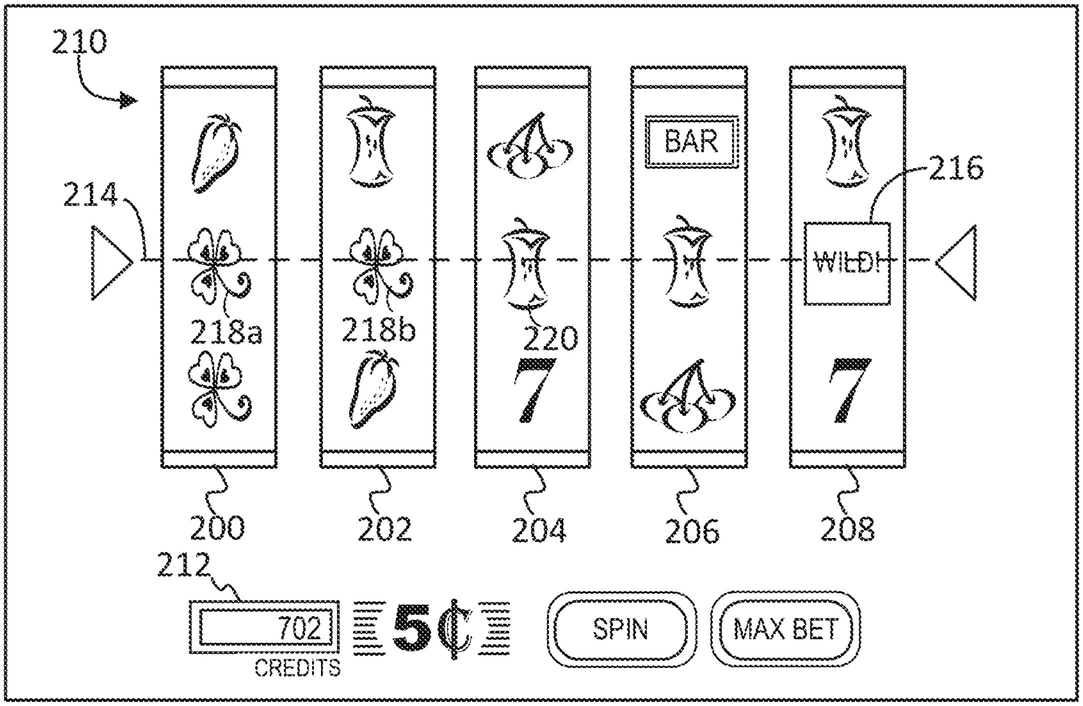
FIGS. 4 and 5 are diagrams of a game cycle illustrating aspects of the embodiment in FIG. 3.

At step 104, the game-logic circuitry detects, via at least one of one or more electronic input devices, a physical item associated with a monetary value that establishes a credit balance. As shown in FIG. 4, the credit balance may be shown on a credit meter 212 of the gaming machine.

At step 106, the game-logic circuitry initiates a wagering game cycle in response to an input indicative of a wager covered by the credit balance. To initiate a spin of the reels, the player may press a "Spin" or "Max Bet" key on a button panel or touch screen.

At step 108, using an RNG, the game-logic circuitry spins and stops the plurality of symbol-bearing reels to randomly land symbols on the reels in the array in visual association with one or more paylines (also known as lines, ways, patterns, or arrangements). The game-logic circuitry is configured to evaluate the displayed array of symbols and provides immediate awards and bonus games in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus games based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array. Each payline preferably consists of a single symbol position in each column of the array. The number of paylines may be as few as one or as many as possible given each payline consists of a single symbol position in each column of the array. In a 3×5 array with three rows and five columns, the maximum number of such paylines is $3^5=243$ lines. FIG. 4 illustrates the reels 200, 202, 204, 206, 208 after they have been spun and stopped to randomly populate the array 210 with symbols from the reels. The landed symbols are shown relative to a single horizontal payline 214 spanning the middle row of the array 210.

At step 110, the game-logic circuitry determines whether or not a partial replay or rewind condition has occurred. The partial replay condition may, for example, be the combination of (a) a first triggering event such as the appearance of a predetermined triggering symbol, e.g., a wild symbol, on the rightmost reel along an active payline, and (b) a second triggering event wherein the array includes (i) a set of one or more advantageous symbols on adjacent reels along an active payline starting from the leftmost reel, e.g., the first reel 200 in FIG. 4, and (ii) a non-advantageous symbol along that payline and adjacent to the set of advantageous symbols. The set of advantageous symbols may, for example, be two or more matching symbols in the pay table. If the pay table requires a line pay to include three or more matching symbols on adjacent reels along a payline starting from the leftmost reel, then a non-advantageous symbol would be a symbol that does not match the advantageous symbols and thereby blocks or shortens a line pay. For example, if a line pay requires three, four, or five matching symbols starting from the leftmost reel, then the second triggering event may be two or three adjacent matching symbols along an active payline starting from the leftmost reel, and a non-matching symbol along that payline and adjacent to the matching symbols. In another embodiment, the second triggering event may be a single advantageous symbol, e.g., a top award symbol or bonus triggering symbol, on the leftmost reel along an active payline.

If the partial replay condition has not occurred at step 110, the data processing method proceeds to step 114 where the game-logic circuitry awards payouts for line pays, scatter pays, and any other types of pays provided by the game.

Figure 5:
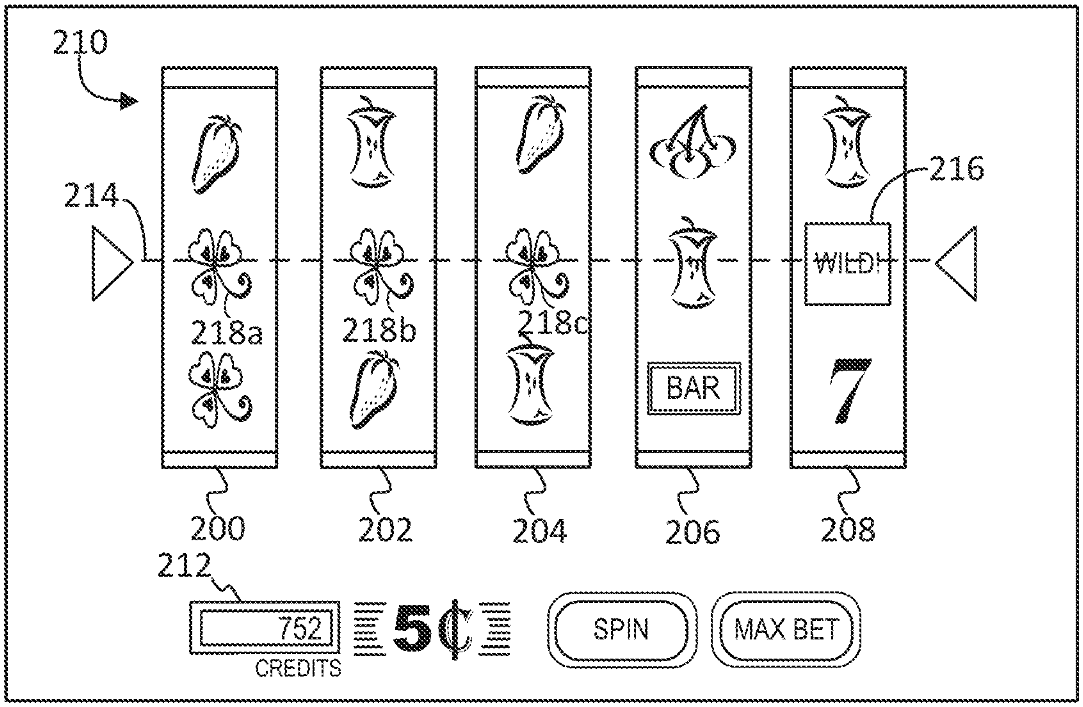

If, however, a partial replay condition has occurred at step 110, the data processing method proceeds to step 112. In the example shown in FIG. 4, the partial replay condition has occurred: a wild symbol 216 appears on the rightmost reel 208 along the payline 214, and a pair of matching CLOVER symbols 218*a*, 218*b* and a nonmatching APPLE symbol 220 appear on adjacent reels 200, 202, 204 along the payline 214 starting from the leftmost reel 200. The APPLE symbol 220 blocks a line pay of three or more CLOVER symbols. At step 112, the game-logic circuitry holds any of the reels bearing the set of advantageous symbols, and respins and stops any of the reels bearing the set of non-advantageous symbols to randomly place symbols on the respun reels in the array relative to the payline(s). If the first triggering event is a wild symbol on the rightmost reel along an active payline, the rightmost reel is preferably held, i.e., not respun, because the wild symbol can substitute for (i.e., act as) the advantageous symbols in a line pay. In the example shown in FIG. 4, the reels 200, 202, 208 are held, while the reels 204, 206 are respun and stopped to yield the array 210 of modified symbols in FIG. 5. As shown in FIG. 5, another CLOVER symbol 218*c* on the third reel 204 landed along the payline 214.

When the replay condition occurs while there are other winning combinations (e.g., scatter pays and line pays on paylines other than the payline 214) in the array, the game-logic circuitry may accommodate such other winning combinations in various ways. In one embodiment, the game-logic circuitry awards payouts for such other winning combinations prior to holding and respinning any reels at step 112. In another embodiment, in addition to holding or locking the reels bearing the advantageous symbols, the game-logic circuitry may also hold or lock symbols in such other winning combinations in the array in place (e.g., as an overlay) as the reels bearing such other winning symbols are respun. In other words, such other winning symbols remain superimposed in their respective positions in the array even as their associated reels are respun and cause symbols from the respun reels to land in those same positions. Then, at step 114 described below, the player would be paid for both the held winning symbols as well as any other winning combinations resulting from the hold-and-respin step 112. In this manner, the partial replay condition would not reduce or eliminate payouts for other winning combinations in the process of potentially creating or improving a winning combination containing the advantageous symbols.

After executing the hold-and-respin logic at step 112, the game-logic circuitry proceeds to step 114 where it awards payouts for line pays, scatter pays, and any other types of pays provided by the game. In the example shown in FIG. 5, the game-logic circuitry awards a line pay for three CLOVER symbols 218*a*, 218*b*, 218*c* along the payline 214. If another CLOVER symbol on the fourth reel 206 had landed along the payline 214, the game-logic circuitry would have awarded a line pay for five CLOVER symbols due to the four CLOVER symbols on respective reels 200, 202, 204, 206 plus the held wild symbol 216 on reel 208.

At step 116, the game-logic circuitry determines whether or not it has received a cashout input via at least one of the one or more electronic input devices of the gaming machine. If it has not received a cashout input, the game-logic circuitry waits for the next wager input at step 106. If it has received a cashout input, the game-logic circuitry initiates a payout from the credit balance on the credit meter such as the meter 212 in FIG. 5. The data processing method then ends at step 118.

Figure 6:
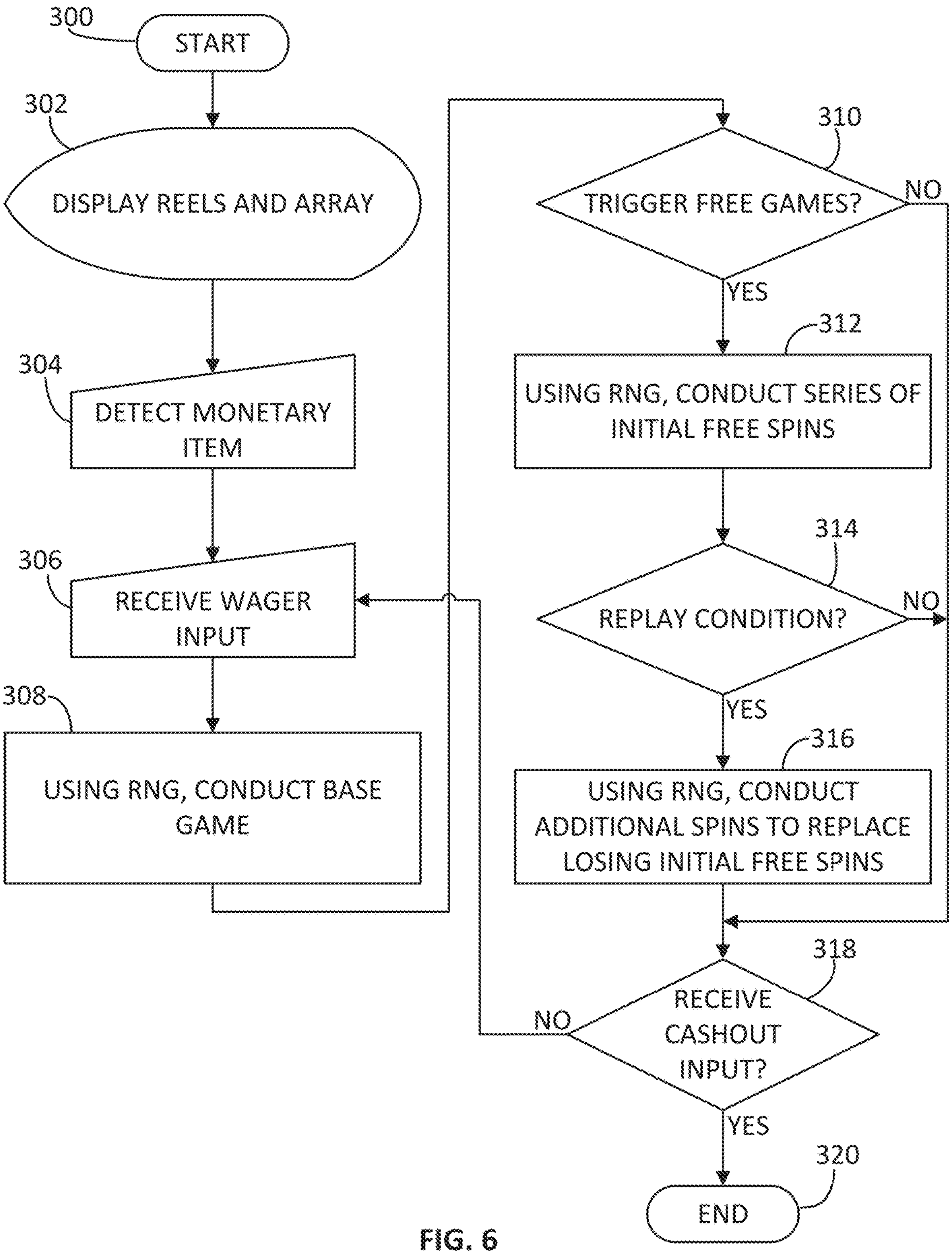
FIG. 6 is a flowchart for an algorithm that corresponds to instructions executed by a controller, according to another embodiment of the present invention.

Referring now to FIG. 6, there is shown a flowchart representing one data processing method corresponding to at least some instructions stored and executed by the game-logic circuitry 40 in FIG. 2 to perform operations according to another embodiment of the present invention. The operations are described below in conjunction with FIGS. 7 through 14, which depict diagrams associated with a game cycle illustrating aspects of this embodiment.

The data processing method commences at step 300. At step 302, the game-logic circuitry directs an electronic display device (e.g., video display) of the gaming machine to display a plurality of symbol-bearing reels and an array of symbol positions. The reels and array may be constructed and arranged as described above in connection with FIG. 3. In the example shown in FIG. 7, the electronic display device displays three symbol-bearing reels 400, 402, and 404 arranged from left to right and associated with respective columns of a 3×3 array 410 that includes three rows and three columns.

At step 304, the game-logic circuitry detects, via at least one of one or more electronic input devices, a physical item associated with a monetary value that establishes a credit balance. The credit balance may be shown on a credit meter of the gaming machine.

At step 306, the game-logic circuitry initiates a wagering game cycle in response to an input indicative of a wager covered by the credit balance. To initiate a spin of the reels, the player may press a "Spin" or "Max Bet" key on a button panel or touch screen.

Figure 7:
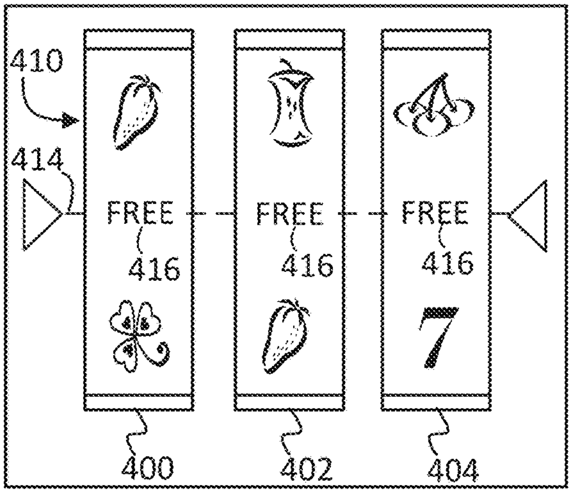
FIGS. 7 through 14 are diagrams of a game cycle, including a triggered series of free games, illustrating aspects of the embodiment in FIG. 6.
Figure 8:
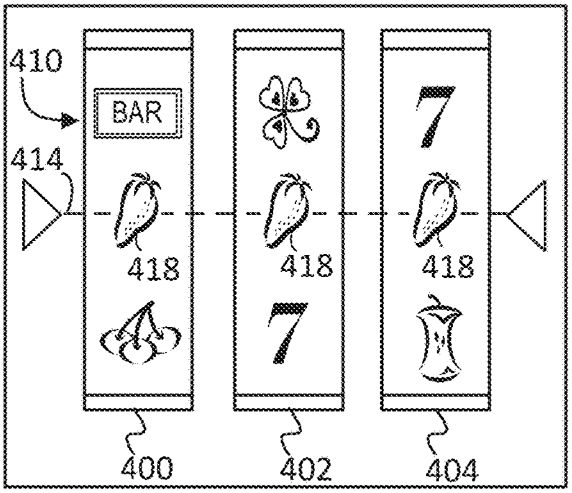
Figure 9:
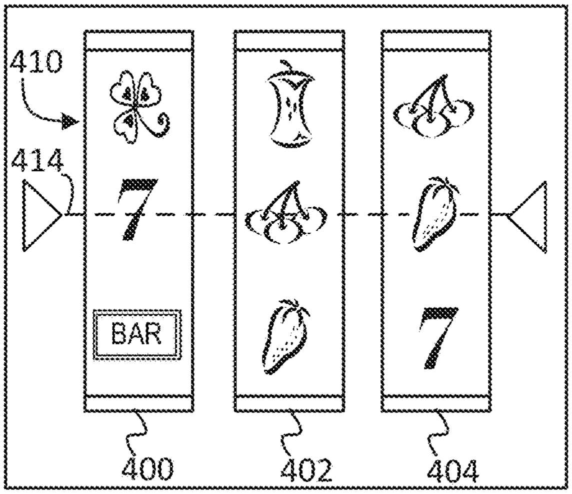
Figure 10:
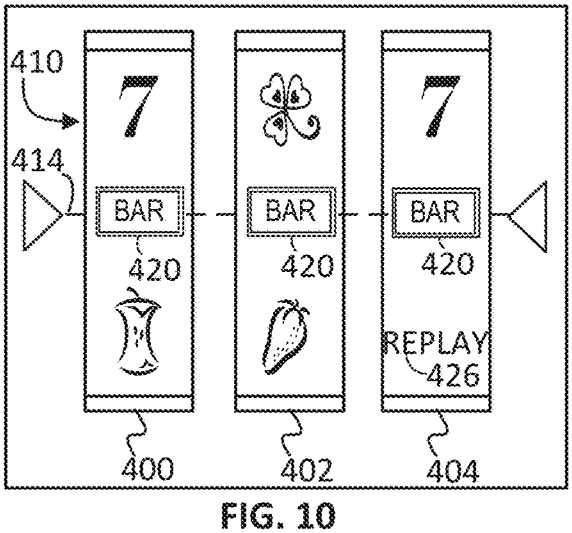
Figure 11:
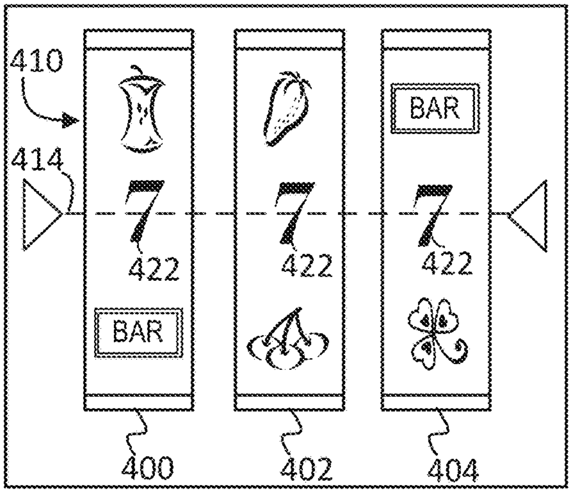
Figure 12:
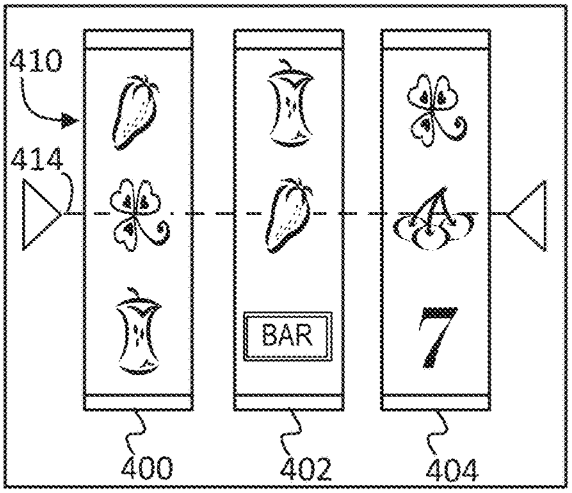
Figure 13:
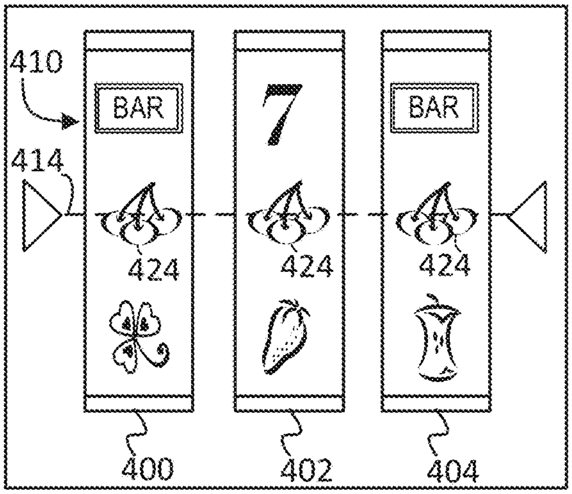
Figure 14:
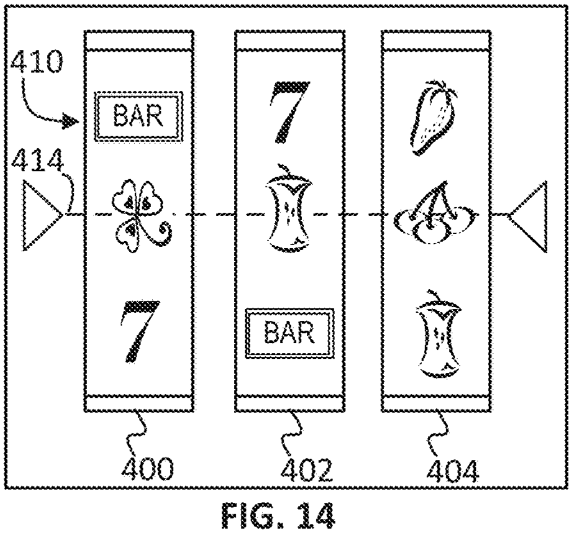

At step 308, using an RNG, the game-logic circuitry conducts a base game by animating the spinning and stopping of the plurality of symbol-bearing reels to randomly land symbols on the reels in the array in visual association with one or more paylines (also known as lines, ways, patterns, or arrangements). As described above in connection with FIG. 3, the game-logic circuitry awards payouts for line pays, scatter pays, and any other types of pays in accordance with a pay table. In a 3×3 array with three rows and three columns, the maximum number of paylines (wherein each payline consists of a single symbol position in each column of the array) is $3^3=27$ lines. FIG. 7 illustrates the reels 400, 402, 404 after they have been spun and stopped to randomly populate the array 410 with symbols from the reels. The landed symbols are shown relative to a single horizontal payline 414 spanning the middle row of the array 410.

At step 310, the game-logic circuitry determines whether or not a series of free games have been triggered. If the series of free games has not been triggered at step 310, the data processing method proceeds to step 318.

If, however, the series of free games has been triggered at step 310, the data processing method proceeds to step 312. In the example shown in FIG. 7, the series of free games has been triggered by three FREE symbols 416 along the payline 414. In other embodiments, the series of free games may be triggered by other triggering events such as a single triggering symbol anywhere in the array, a single triggering symbol in a particular position in the array (e.g., on the rightmost reel along an active payline), scatter triggers, or mystery events.

At step 312, using a random number generator, the game-logic circuitry conducts a series of initial free spins of the plurality of symbol-bearing reels. Each initial free spin involves animating the spinning and stopping of the plurality of symbol-bearing reels to randomly land symbols on the reels in an array. The number of initial free spins may be fixed or random and may vary from just a few free spins to dozens or more free spins. FIGS. 8-12 illustrate the respective symbol arrays resulting from a series of five initial free spins. The free spins in FIGS. 8, 10, and 11 result in winning outcomes, while the free spins in FIGS. 9 and 12 result in losing outcomes. More specifically, the free spin in FIG. 8 yields a line pay of three STRAWBERRY symbols 418 along the payline 414; the free spin in FIG. 10 yields a line pay of three BAR symbols 420 along the payline 414; and the free spin in FIG. 11 yields a line pay of three SEVEN symbols 422 along the payline 414. The game-logic circuitry awards payouts for these line pays, as well as any other pays defined by the pay table.

At step 314, the game-logic determines whether or not a replay condition has occurred during the series of initial free spins. The replay condition may, for example, be the appearance of a triggering symbol during any of the initial free spins or in the last free spin. In another embodiment, the replay condition is a mystery event that randomly occurs independent of any symbols appearing in the array during the initial free spins. In yet another embodiment, the replay condition always occurs and does not require a random symbol or mystery trigger to occur. In the illustrated example, the replay condition is the appearance of a REPLAY or other second-chance symbol during any of the initial free spins.

If the replay condition has not occurred at step 314, the data processing method proceeds to step 318.

If, however, the replay condition has occurred at step 314, the data processing method proceeds to step 316. In the illustrated example, the replay condition occurred when the initial free spin in FIG. 10 yielded the REPLAY symbol 426. At step 316, the game-logic circuitry conducts an additional free spin of the plurality of symbol-bearing reels for each initial free spin that yielded a losing outcome. Each additional spin comprises animating the spinning and stopping of the plurality of symbol-bearing reels to randomly land symbols on the reels in the array. In one embodiment, a losing outcome is an outcome associated with a payout below a predetermined threshold. In another embodiment, a losing outcome is an outcome associated with no payout. In the illustrated example, the initial free spins in FIGS. 9 and 12 resulted in losing outcomes. These two losing spins are replayed, i.e., discarded and replaced with the two additional free spins shown in FIGS. 13 and 14. The free spin in FIG. 13 yields a line pay of three CHERRY symbols 424 along the payline 414, while the free spin in FIG. 14 yields a losing outcome. The game-logic circuitry awards a payout for the line pay, as well as any other pays defined by the pay table. If an additional spin that replaced a losing spin yields a lower payout than the losing spin (if a losing spin is defined as one resulting in a payout below a predetermined threshold), then the game-logic circuitry may award the higher of the two payouts between the additional spin and the losing spin.

In one embodiment, the game-logic circuitry only replays the losing spins that were presented on the display device up to the time of presentation of the replay condition. In the example shown in FIGS. 8-12, the replay condition occurred in FIG. 10. Thus, the game-logic circuitry would only conduct an additional spin to replace the losing spin in FIG. 9 and would not conduct an additional spin to replace the losing spin in FIG. 12.

Each additional free spin may be associated with an enhancement that was not associated with the set of initial free spins. The enhancement may, for example, be a payout multiplier, upgraded reel strips (e.g., more wild symbols, more higher paying symbols, less lower paying symbols, etc.), upgrading a landed symbol (e.g., to a wild symbol or higher paying symbol), changing a line-pay symbol to a scatter symbol, additional paylines, and/or awarding extra credits beyond the payout for any winning outcome.

If the replay condition occurs again during the additional free spins, the game-logic circuitry may conduct another additional free spin for each additional free spin that yielded a losing outcome.

At step 318, the game-logic circuitry determines whether or not it has received a cashout input via at least one of the one or more electronic input devices of the gaming machine. If it has not received a cashout input, the game-logic circuitry waits for the next wager input at step 306. If it has received a cashout input, the game-logic circuitry initiates a payout from the credit balance on the credit meter. The data processing method then ends at step 320.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the gaming machine including game-logic circuitry, one or more memory devices, a value input device, a value output device, and a presentation assembly, the presentation assembly including a plurality of electromechanical symbol-bearing reels, the method comprising the operations of:

generating, by the game-logic circuitry via execution of an authentication program stored in the one or more memory devices, a live authentication code based on contents of at least one of the one or more memory devices;

comparing, by the game-logic circuitry, the live authentication code to a trusted authentication code stored in the one or more memory devices;

permitting execution of random-number-generator (RNG) programming and game-outcome logic stored in the one or more memory devices based on the comparing;

detecting, via the value input device, a physical item associated with a monetary value that establishes a monetary balance;

in response to the permitting, conducting, by the game-logic circuitry using the RNG, a sequence of two or more initial spins, conducted one after another, of the plurality of electromechanical reels, each initial spin of the sequence comprising animating the spinning and stopping of all of the plurality of electromechanical reels to randomly land a respective set of symbols on the reels in an array;

upon completion of the sequence of initial spins and in response to a triggering event that includes at least one initial spin of the sequence having yielded a losing outcome, conducting, by the game-logic circuitry using the RNG, a respective additional spin of all of the plurality of electromechanical reels for each initial spin of the sequence that yielded a losing outcome, each respective additional spin comprising animating the spinning and stopping of all of the plurality of electromechanical reels to randomly land symbols on the reels in the array, the respective additional spin replacing the losing outcome of the corresponding initial spin, and wherein no additional spin is conducted for any initial spin of the sequence that yielded a winning outcome;

conducting, by the game-logic circuitry using the RNG, a further additional spin of all of the plurality of electromechanical reels for each respective additional spin that yielded a losing outcome, wherein no further additional spin is conducted for any respective additional spin that yielded a winning outcome;

presenting, by the presentation assembly, a payout for any winning outcomes resulting from the initial and the additional spins, the payout being added to the monetary balance; and dispensing, via the value output device, a payout from the monetary balance.

2. The method of claim 1, further comprising conducting, by the game-logic circuitry using the random number generator, a base game spin of the plurality of electromechanical reels, and wherein the operation of conducting the series of initial spins is in response to a bonus triggering event during the base game spin.

3. The method of claim 1, wherein the losing outcome is associated with a payout below a predetermined threshold.

4. The method of claim 3, wherein the losing outcome is associated with no payout.

5. The method of claim 1, wherein each additional spin is associated with an enhancement that was not associated with the set of initial spins.

6. The method of claim 5, wherein the enhancement is at least one of a payout multiplier, upgraded reel strips, upgrading a landed symbol, changing a line-pay symbol to a scatter symbol, additional paylines, or awarding extra credits beyond the payout for any winning outcome.

7. The method of claim 1, wherein the gaming machine is regulatorily approved and primarily dedicated to playing a wagering game.

8. A gaming machine comprising:

a presentation assembly including a plurality of electromechanical symbol-bearing reels;

a value input device configured to detect a physical item associated with a monetary value that establishes a monetary balance;

a value output device configured to dispense a payout from the monetary balance; and game-logic circuitry comprising one or more processors and one or more memory devices, the one or more memory devices storing (i) an authentication program, (ii) a trusted authentication code, and (iii) random-number-generator (RNG) programming and game-outcome logic, the game-logic circuitry configured to perform the operations of:

generating, via execution of the authentication program, a live authentication code based on contents of at least one of the one or more memory devices;

comparing the live authentication code to the trusted authentication code;

permitting execution of the RNG programming and the game-outcome logic based on the comparing;

in response to the permitting:

using the RNG, conducting a sequence of two or more initial spins, conducted one after another, of the plurality of electromechanical reels, each initial spin of the sequence comprising animating the spinning and stopping of all of the plurality of electromechanical reels to randomly land a respective set of symbols on the reels in an array;

upon completion of the sequence of initial spins and in response to a triggering event that includes at least one initial spin of the sequence having yielded a losing outcome and using the RNG, conducting a respective additional spin of all of the plurality of electromechanical reels for each initial spin of the sequence that yielded a losing outcome, each respective additional spin comprising animating the spinning and stopping of all of the plurality of electromechanical reels to randomly land symbols on the reels in the array, the respective additional spin replacing the losing outcome of the corresponding initial spin, and wherein no additional spin is conducted for any initial spin of the sequence that yielded a winning outcome;

using the RNG, conducting a further additional spin of all of the plurality of electromechanical reels for each respective additional spin that yielded a losing outcome, wherein no further additional spin is conducted for any respective additional spin that yielded a winning outcome; and directing the presentation assembly to present a payout for any winning outcomes resulting from the initial and the additional spins, the payout being added to the monetary balance.

9. The gaming machine of claim 8, wherein the gaming machine is further configured to perform the operation of conducting a base game spin of the plurality of electromechanical reels, and wherein the operation of conducting the series of initial spins is in response to a bonus triggering event during the base game spin.

10. The gaming machine of claim 8, wherein the losing outcome is associated with a payout below a predetermined threshold.

11. The gaming machine of claim 10, wherein the losing outcome is associated with no payout.

12. The gaming machine of claim 8, wherein each additional spin is associated with an enhancement that was not associated with the set of initial spins.

13. The gaming machine of claim 12, wherein the enhancement is at least one of a payout multiplier, upgraded reel strips, upgrading a landed symbol, changing a line-pay symbol to a scatter symbol, additional paylines, or awarding extra credits beyond the payout for any winning outcome.

14. The gaming machine of claim 8, wherein the gaming machine is regulatorily approved and primarily dedicated to playing a wagering game.

* * * * *